(12) United States Patent
Monastyrshyn et al.

(10) Patent No.: US 12,231,806 B2
(45) Date of Patent: *Feb. 18, 2025

(54) REAL TIME PAINTING OF A VIDEO STREAM

(71) Applicant: Snap Inc., Santa Monica, CA (US)

(72) Inventors: Yurii Monastyrshyn, Santa Monica, CA (US); Illia Tulupov, Odessa (UA)

(73) Assignee: Snap Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/223,215

(22) Filed: Jul. 18, 2023

(65) Prior Publication Data

US 2023/0362327 A1   Nov. 9, 2023

Related U.S. Application Data

(63) Continuation of application No. 17/530,094, filed on Nov. 18, 2021, now Pat. No. 11,750,770, which is a
(Continued)

(51) Int. Cl.
*H04N 5/77* (2006.01)
*G06F 3/04883* (2022.01)
(Continued)

(52) U.S. Cl.
CPC ........... *H04N 5/77* (2013.01); *G06F 3/04883* (2013.01); *G06T 3/40* (2013.01); *G06V 40/165* (2022.01);
(Continued)

(58) Field of Classification Search
CPC .... H04N 5/77; H04N 21/44008; H04N 21/84; H04N 21/2187; G06F 3/04883; G06T 3/40; G06T 2207/30201; G06V 40/165
See application file for complete search history.

(56) References Cited

U.S. PATENT DOCUMENTS 6,038,295 A    3/2000 Mattes
6,226,015 B1 *  5/2001 Danneels ................ G06T 13/80
                                                345/611
(Continued)

FOREIGN PATENT DOCUMENTS

CA        2887596 A1    7/2015
CN      102055912 A    5/2011
(Continued)

OTHER PUBLICATIONS

"U.S. Appl. No. 15/213,186, Final Office Action mailed Nov. 14, 2018", 62 pgs.
(Continued)

*Primary Examiner* — Keith D Bloomquist
(74) *Attorney, Agent, or Firm* — Schwegman Lundberg & Woessner, P.A.

(57) ABSTRACT

Systems, devices, media, and methods are presented for generating graphical representations within frames of a video stream in real time. The systems and methods receive a frame depicting a portion of a face, identify user input, identify positions on the portion of the face corresponding to the user input. The systems and methods generate a graphical representation of the user input linked to positions on the portion of the face and render the graphical representation within frames of the video stream in real time.

20 Claims, 11 Drawing Sheets

Related U.S. Application Data continuation of application No. 16/789,121, filed on Feb. 12, 2020, now Pat. No. 11,212,482, which is a continuation of application No. 15/213,186, filed on Jul. 18, 2016, now Pat. No. 10,609,324.

(51) Int. Cl.
*G06T 3/40* (2006.01)
*G06V 40/16* (2022.01)
*H04N 21/44* (2011.01)
*H04N 21/84* (2011.01)

(52) U.S. Cl.
CPC ....... *H04N 21/44008* (2013.01); *H04N 21/84* (2013.01); *G06T 2207/30201* (2013.01)

(56) References Cited

U.S. PATENT DOCUMENTS

| | | |
|---|---|---|
| 6,980,909 B2 | 12/2005 | Root et al. |
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,298,884 B1 | 3/2016 | Ahmad |
| 9,436,304 B1 | 9/2016 | Leiba et al. |
| 9,443,227 B2 | 9/2016 | Evans et al. |
| 9,489,661 B2 | 11/2016 | Evans et al. |
| 9,491,134 B2 | 11/2016 | Rosen et al. |
| 10,349,001 B1* | 7/2019 | Markert ............... G11B 31/006 |
| 10,609,324 B2 | 3/2020 | Monastyrshyn et al. |
| 11,212,482 B2 | 12/2021 | Monastyrshyn et al. |
| 11,750,770 B2 | 9/2023 | Monastyrshyn et al. |
| 2003/0001868 A1 | 1/2003 | Sack et al. |
| 2007/0006080 A1 | 1/2007 | Finger et al. |
| 2007/0200925 A1* | 8/2007 | Kim ..................... G06T 11/00 348/E7.079 |
| 2007/0268314 A1 | 11/2007 | Kizuka |
| 2008/0158334 A1 | 7/2008 | Reponen et al. |
| 2008/0235724 A1 | 9/2008 | Sassenscheidt et al. |
| 2009/0027388 A1 | 1/2009 | Furuhashi |
| 2009/0202114 A1 | 8/2009 | Morin et al. |
| 2010/0247062 A1 | 9/2010 | Bailey |
| 2011/0202598 A1 | 8/2011 | Evans et al. |
| 2011/0304607 A1 | 12/2011 | Ito |
| 2012/0069028 A1* | 3/2012 | Bouguerra ............ H04L 51/046 715/810 |
| 2012/0194697 A1* | 8/2012 | Hasegawa ............ G06F 18/214 348/222.1 |
| 2012/0206558 A1 | 8/2012 | Setton |
| 2012/0209924 A1 | 8/2012 | Evans et al. |
| 2012/0326993 A1* | 12/2012 | Weisman ................ G06F 9/453 345/173 |
| 2014/0053115 A1 | 2/2014 | Perski et al. |
| 2014/0223279 A1 | 8/2014 | Algreatly |
| 2014/0310586 A1 | 10/2014 | Lewis et al. |
| 2015/0172599 A1* | 6/2015 | Caldwell ................ H04N 7/157 348/14.03 |
| 2015/0310305 A1* | 10/2015 | Fang ..................... G06T 11/001 345/441 |
| 2015/0365627 A1* | 12/2015 | Deng ..................... H04N 23/80 348/14.07 |
| 2016/0027202 A1 | 1/2016 | Sudheendra et al. |
| 2016/0127681 A1* | 5/2016 | Turbell ............... H04N 21/4788 348/14.03 |
| 2016/0191958 A1 | 6/2016 | Nauseef et al. |
| 2016/0196665 A1 | 7/2016 | Abreu et al. |
| 2018/0018079 A1 | 1/2018 | Monastyrshyn et al. |
| 2020/0186747 A1 | 6/2020 | Monastyrshyn et al. |
| 2022/0078370 A1 | 3/2022 | Monastyrshyn et al. |

FOREIGN PATENT DOCUMENTS

| | | |
|---|---|---|
| CN | 105447823 A | 3/2016 |
| CN | 105763829 A | 7/2016 |
| CN | 109716781 A | 5/2019 |
| CN | 109716781 B | 12/2021 |
| CN | 114143570 A | 3/2022 |
| EP | 2394714 A1 | 12/2011 |
| EP | 3485649 A1 | 5/2019 |
| GB | 2518589 A | 4/2015 |
| KR | 20080019246 A | 3/2008 |
| KR | 102137041 B1 | 7/2020 |
| KR | 102173620 B1 | 10/2020 |
| KR | 102329583 B1 | 11/2021 |
| WO | WO-2016069814 A1 | 5/2016 |
| WO | WO-2018017592 A1 | 1/2018 |

OTHER PUBLICATIONS

"U.S. Appl. No. 15/213,186, Non Final Office Action mailed May 8, 2018", 58 pgs.

"U.S. Appl. No. 15/213,186, Non Final Office Action mailed Jul. 9, 2019", 60 pgs.

"U.S. Appl. No. 15/213,186, Notice of Allowance mailed Nov. 18, 2019", 6 pgs.

"U.S. Appl. No. 15/213,186, Response filed Jan. 4, 2019 to Final Office Action mailed Nov. 14, 2018", 12 pgsl.

"U.S. Appl. No. 15/213,186, Response filed Sep. 5, 2018 to Non Final Office Action mailed May 8, 2018", 12 pgs.

"U.S. Appl. No. 15/213,186, Response filed Oct. 7, 2019 to Non-Final Office Action mailed Jul. 9, 2019", 13 pgs.

"U.S. Appl. No. 16/789,121, Final Office Action mailed Jun. 17, 2021", 17 pgs.

"U.S. Appl. No. 16/789,121, Non Final Office Action mailed Dec. 24, 2020", 16 pgs.

"U.S. Appl. No. 16/789,121, Notice of Allowance mailed Aug. 25, 2021", 5 pgs.

"U.S. Appl. No. 16/789, 20121, Response filed Mar. 22, 2021 to Non Final Office Action mailed Dec. 24, 2020", 11 pgs.

"U.S. Appl. No. 16/789,121, Response filed Aug. 2, 2021 to Final Office Action mailed Jun. 17, 2021", 9 pgs.

"U.S. Appl. No. 17/530,094, Non Final Office Action mailed Dec. 7, 2022", 18 pgs.

"U.S. Appl. No. 17/530,094, Notice of Allowance mailed Apr. 24, 2023", 5 pgs.

"U.S. Appl. No. 17/530,094, Response filed Feb. 20, 2023 to Non Final Office Action mailed Dec. 7, 2022", 11 pgs.

"Chinese Application Serial No. 201780056702.3, Office Action mailed Mar. 23, 2021", w/ English Translation, 10 pgs.

"Chinese Application Serial No. 201780056702.3, Office Action mailed Jul. 13, 2021", w/ English Translation, 5 pgs.

"Chinese Application Serial No. 201780056702.3, Office Action mailed Sep. 15, 2020", w/ English translation, 14 pgs.

"Chinese Application Serial No. 201780056702.3, Response filed May 18, 2021 to Office Action mailed Mar. 23, 2021", w/ English Claims, 18 pgs.

"Chinese Application Serial No. 201780056702.3, Response filed Sep. 23, 2021 to Office Action mailed Jul. 13, 2021", w/ English Claims, 20 pgs.

"Chinese Application Serial No. 201780056702.3, Response filed Dec. 4, 2020 to Office Action mailed Sep. 15, 2020", w/ English Claims, 113 pgs.

"Chinese Application Serial No. 201780056702.3, Voluntary Amendment Filed Jul. 26, 2019", 8 pgs.

(56) References Cited

OTHER PUBLICATIONS

"European Application Serial No. 17752515.1, Communication Pursuant to Article 94(3) EPC mailed May 20, 2020", 5 pgs.
"European Application Serial No. 17752515.1, Communication Pursuant to Article 94(3) EPC mailed Nov. 2, 2020", 4 pgs.
"European Application Serial No. 17752515.1, Decision to refuse a European Patent Application mailed Mar. 30, 2022", 13 pgs.
"European Application Serial No. 17752515.1, Response filed Mar. 4, 2021 to Communication Pursuant to Article 94(3) EPC mailed Nov. 2, 2020", 17 pgs.
"European Application Serial No. 17752515.1, Response filed May 30, 2019 to Communication Pursuant to Rules 161(1) and 162 EPC", w/ English Claims, 54 pgs.
"European Application Serial No. 17752515.1, Response filed Sep. 24, 2020 to Communication Pursuant to Article 94(3) EPC mailed May 20, 2020", 23 pgs.
"European Application Serial No. 17752515.1, Summons to attend oral proceedings mailed May 6, 2021", 7 pgs.
"European Application Serial No. 22177966.3, Extended European Search Report mailed Dec. 14, 2022", 7 pgs.
"International Application Serial No. PCT/US2017/042636, International Preliminary Report on Patentability mailed Jan. 31, 2019", 8 pgs.
"International Application Serial No. PCT/US2017/042636, International Search Report mailed Oct. 11, 2017", 4 pgs.
"International Application Serial No. PCT/US2017/042636, Written Opinion mailed Octt. 11, 2017", 8 pgs.
"Korean Application Serial No. 10-2020-7031142, Final Office Action mailed Jul. 27, 2021", w/ English Translation, 7 pgs.
"Korean Application Serial No. 10-2020-7031142, Notice of Preliminary Rejection mailed Jan. 13, 2021", w/ English Translation, 10 pgs.
"Korean Application Serial No. 10-2020-7031142, Response filed Mar. 12, 2021 to Notice of Preliminary Rejection mailed Jan. 13, 2021", w/ English Claims, 22 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

* cited by examiner

REAL TIME PAINTING OF A VIDEO STREAM

PRIORITY CLAIM

This application is a continuation of U.S. patent application Ser. No. 17/530,094, filed on Nov. 18, 2021, which is a continuation of U.S. patent application Ser. No. 16/789,121, filed on Feb. 12, 2020, which is a continuation of U.S. patent application Ser. No. 15/213,186, filed on Jul. 18, 2016, each of which are incorporated herein by reference in their entireties.

TECHNICAL FIELD

Embodiments of the present disclosure relate generally to automated processing of images. More particularly, but not by way of limitation, the present disclosure addresses systems and methods for generating persistent graphical representations of user input within a video stream in real time.

BACKGROUND

Telecommunications applications and devices can provide communication between multiple users using a variety of media, such as text, images, sound recordings, and/or video recording. For example, video conferencing allows two or more individuals to communicate with each other using a combination of software applications, telecommunications devices, and a telecommunications network. Telecommunications devices may also record video streams to transmit as messages across a telecommunications network.

Although telecommunications applications and devices exist to provide two way video communication between two devices, there can be issues with video streaming, such as modifying images within the video stream during pendency of a communication session. Telecommunications devices use physical manipulation of the device in order to perform operations. For example, devices are typically operated by changing an orientation of the device or manipulating an input device, such as a touchscreen. Accordingly, there is still a need in the art to improve video communications between devices and modifying video streams in real time while the video stream is being captured.

BRIEF DESCRIPTION OF THE DRAWINGS

Various ones of the appended drawings merely illustrate example embodiments of the present disclosure and should not be considered as limiting its scope.

Figure 1:
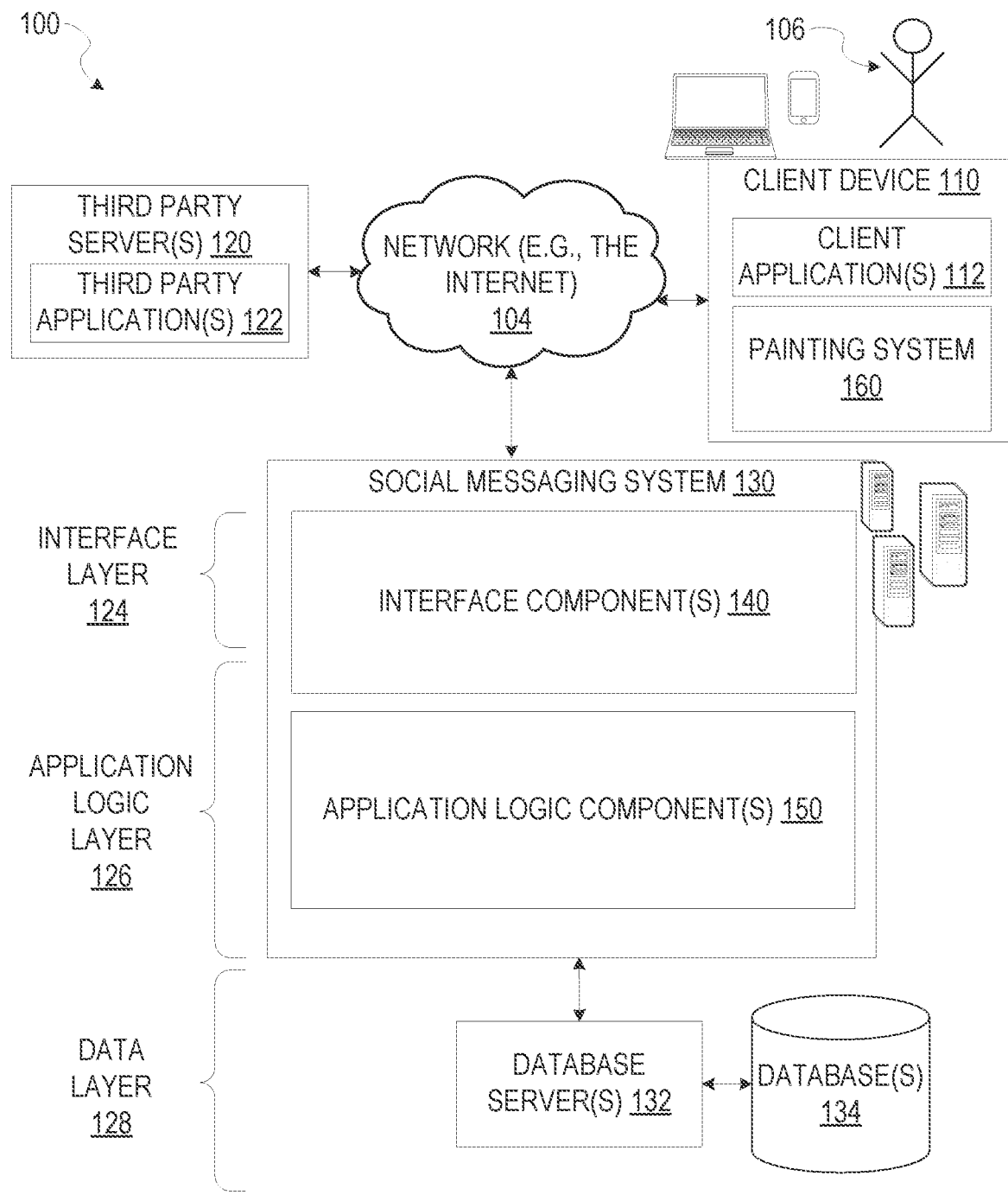
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A painting system is described that identifies and tracks objects of interest across a video stream through a set of frames within the video stream. In various example embodiments, the painting system identifies and tracks facial landmarks, user inputs, and relative aspect ratios between the landmarks or points on a face and the user input. The painting system enables a user to select colors, shapes, lines, and other graphical representations of a user input to paint within frames of a video stream in real time while the video stream is being captured by an image capture device. The painting may be on a face or other object of interest. The painting system enables modification of the video stream to accentuate or otherwise change appearance of the video stream in combination with the painting. For example, the painting system may decrease color, shading, saturation, or brightness of the video stream and present unmodified colors in painted graphical representations such that the painted sections appear neon colored, sparkling, or any other suitable color contrast. A device user at a sports event may, for example, use an interface to paint a team logo or a player number on a cheek of a player present in a video stream being generated by the device. The painting system will then track the player and maintain the painting on the cheek of the player as the player moves within the video stream and as the video stream is transmitted to another device or other devices. In some instances, the device user at the sports event may paint the team logo or the player number on a portion of the screen close to the face of the player, such as in the air just above the player's head. The painting system will then track the player and maintain the painting in the air above the player's head.

The above is one specific example. The various embodiments of the present disclosure relate to devices and instructions by one or more processors of a device to modify an image or a video stream transmitted by the device to another device while the video stream is being captured (e.g., modifying a video stream in real time). A painting system is described that identifies and tracks objects and areas of interest within an image or across a video stream and through a set of images comprising the video stream. In various example embodiments, the painting system identifies and tracks one or more facial features depicted in a video stream or within an image and performs image recognition, facial recognition, and facial processing functions with respect to the one or more facial features and interrelations between two or more facial features.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface components (e.g., a web server) 140, which receives requests from various client-computing devices and servers, such as client devices 110 executing client application(s) 112, and third party servers 120 executing third party application(s) 122. In response to received requests, the interface component 140 communicates appropriate responses to requesting devices via a network 104. For example, the interface components 140 can receive requests such as Hypertext Transfer Protocol (HTTP) requests, or other web-based, Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client devices 110 form all or part of an painting system 160 such that components of the painting system 160 configure the client device 110 to perform a specific set of functions with respect to operations of the painting system 160.

In an example, the client devices 110 are executing the client application(s) 112. The client application(s) 112 can provide functionality to present information to a user 106 and communicate via the network 104 to exchange information with the social messaging system 130. Further, in some examples, the client devices 110 execute functionality of the painting system 160 to segment images of video streams during capture of the video streams and transmit the video streams (e.g., with image data modified based on the segmented images of the video stream).

Each of the client devices 110 can comprise a computing device that includes at least a display and communication capabilities with the network 104 to access the social messaging system 130, other client devices, and third party servers 120. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface components 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the painting system 160 capable of identifying, tracking, and modifying video data during capture of the video data by the client device 110. Similarly, the client device 110 includes a portion of the painting system 160, as described above. In other examples, client device 110 may include the entirety of painting system 160. In instances where the client device 110 includes a portion of (or all of) the painting system 160, the client device 110 can work alone or in cooperation with the social messaging system 130 to provide the functionality of the painting system 160 described herein.

In some embodiments, the social messaging system 130 may be an ephemeral message system that enables ephemeral communications where content (e.g. video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the painting system 160 may identify, track, and modify an object of interest, such as pixels representing skin on a face depicted in the video clip. The device may modify the object of interest during capture of the video clip without image processing after capture of the video clip as a part of a generation of content for an ephemeral message.

Figure 2:
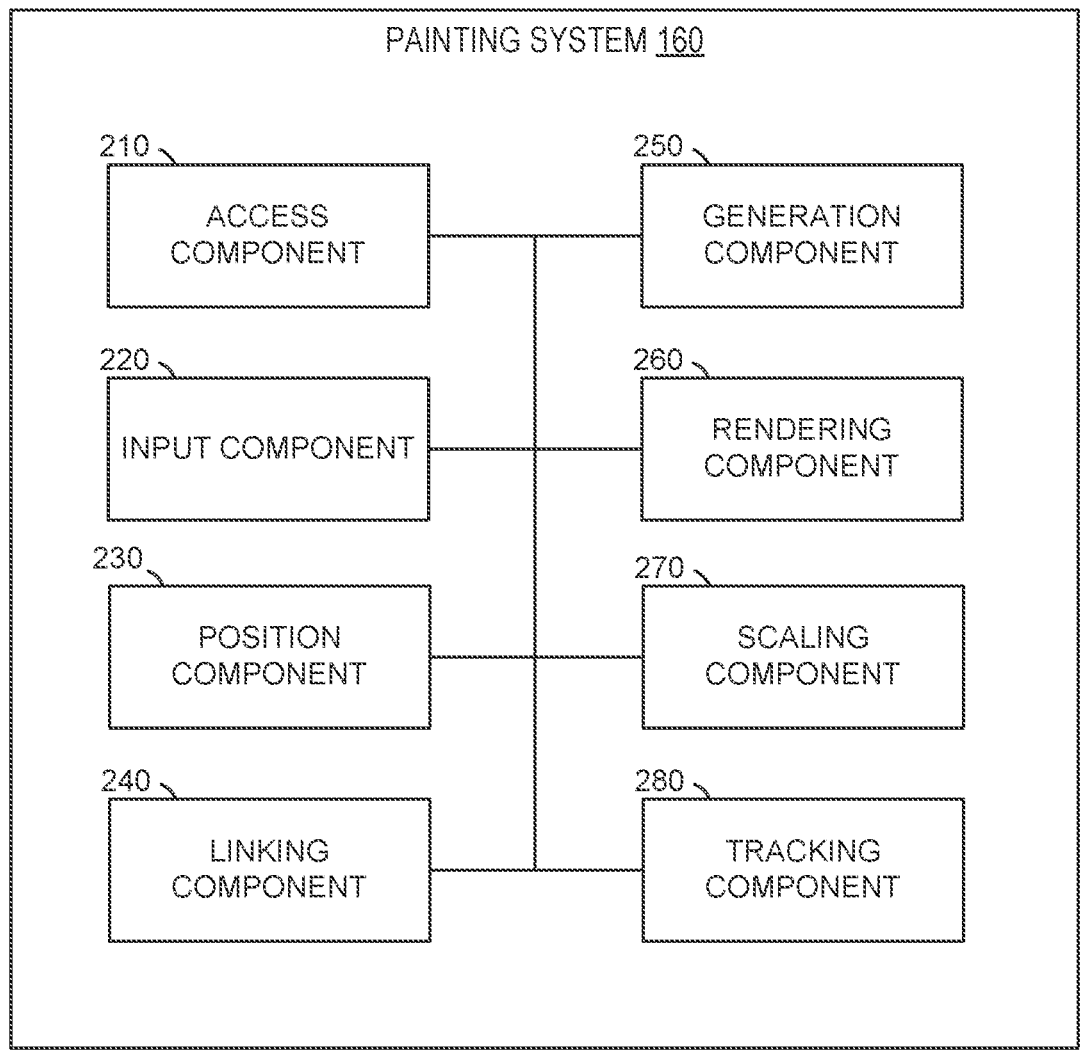
FIG. 2 is a diagram illustrating a painting system, according to some example embodiments.

In FIG. 2, in various embodiments, the painting system 160 can be implemented as a standalone system or implemented in conjunction with the client device 110, and is not necessarily included in the social messaging system 130. The painting system 160 is shown to include an access component 210, an input component 220, a position component 230, a linking component 240, a generation component 250, a rendering component 260, a scaling component 270, and a tracking component 280. All, or some, of the components 210-280, communicate with each other, for example, via a network coupling, shared memory, and the like. Each component of components 210-280 can be implemented as a single component, combined into other components, or further subdivided into multiple components. Other components not pertinent to example embodiments can also be included, but are not shown.

The access component 210 accesses or otherwise retrieves frames captured by an image capture device or otherwise received by or stored in the client device 110. In some instances, the access component 210 may include portions or all of an image capture component configured to cause an image capture device of the client device 110 to capture frames of a video stream based on user interaction with a user interface presented on a display device of the client device 110. The access component 210 may pass frames or portions of frames to one or more other components of the painting system 160.

The input component 220 identifies a user input on an input device of the client device 110. The input component 220 may include portions or all of the input device such as a keyboard, a mouse, a cursor, a touchscreen, or any other suitable input device of the client device 110. Where the input device is a touchscreen, in some example embodiments, the input component 220 identifies and differentiates touch pressure exerted on the touchscreen to identify or differentiate between associated characteristics selected based on the touch pressure.

The position component 230 identifies one or more positions within frames of the video stream. The position component 230 may identify positions on a portion of a face depicted within the frames of the video stream. In some embodiments, the position component 230 may identify or define coordinates, facial landmarks, or points on the portion of the face. The position component 230, in some instances, may determine or generate a facial mesh or mesh elements on the portion of the face, identifying facial landmarks and determining distances between two or more of the facial landmarks.

The linking component 240 links user input received by the input component 220 and one or more positions identified by the position component 230. The linking component 240 may directly link the positions, points, or landmarks on the portion of the face with one or more points of the user input received by the input component 220. In some instances, the linking component 240 links the positions, points, or landmarks of the portion of the face and the user input by linking one or more pixels associated with the user input and one or more pixels associated with the portion of the face.

The generation component 250 generates a graphical representation of the user input. The graphical representation may be generated as a line, portion of a line, shape, color, pattern, or any other representation. In some instances, the generation component 250 may be generated at least in part from a user interface selection for a graphics type and a position of the user input. In some instances, the generation component generates or assigns edge or size characteristics to the graphical representation. The edge and size characteristics modify the depiction of the graphical representation and may be selected as user input through the input device of the client device 110. In some instances, one or more of the edge and size characteristics may be determined by the generation component 250 or other components of the painting system 160 based on the characteristics of the portion of the face or relative distance of the portion of the face.

The rendering component 260 renders the graphical representation within the frames of the video stream. In some instances, the rendering component 260 renders the graphical representation on the portion of the face or within the frame and outside the portion of the face. The rendering component 260 may modify the frames of the video stream to include one or more graphical representations. In some instances, the rendering component 260 stores the graphical representation within a processor-readable storage device. After storage, the rendering component 260 or access component 210 may access the graphical representation and render the previously stored graphical representation in real time within a subsequent video stream.

The scaling component 270 scales the graphical representations based on movement of objects depicted within the frames of the video stream. In some example embodiments, the scaling component 270 scales the size characteristic of the graphical representation based on movement of the portion of the face relative to the client device 110 or the image capture device of the client device 110. In some embodiments, the scaling component 270, while scaling the graphical representations as the portion of the face move within the frame and with respect to the image capture device, may maintain a line weight or aspect ratio between the graphical representation and one or more facial landmarks, positions, or points on the portion of the face or one or more coordinates within the frame but outside of a set of coordinates associated with the portion of the face.

The tracking component 280 tracks movement of objects within the frames of the video stream. In some instances, the tracking component 280 tracks movement of the portion of the face, the one or more facial landmarks of the portion of the face, or specified points on an object of interest. The tracking component 280 may match movement of the one or more facial landmarks, portion of the face, or other object with movement of the graphical representation overlaid on the graphics plane.

Figure 3:
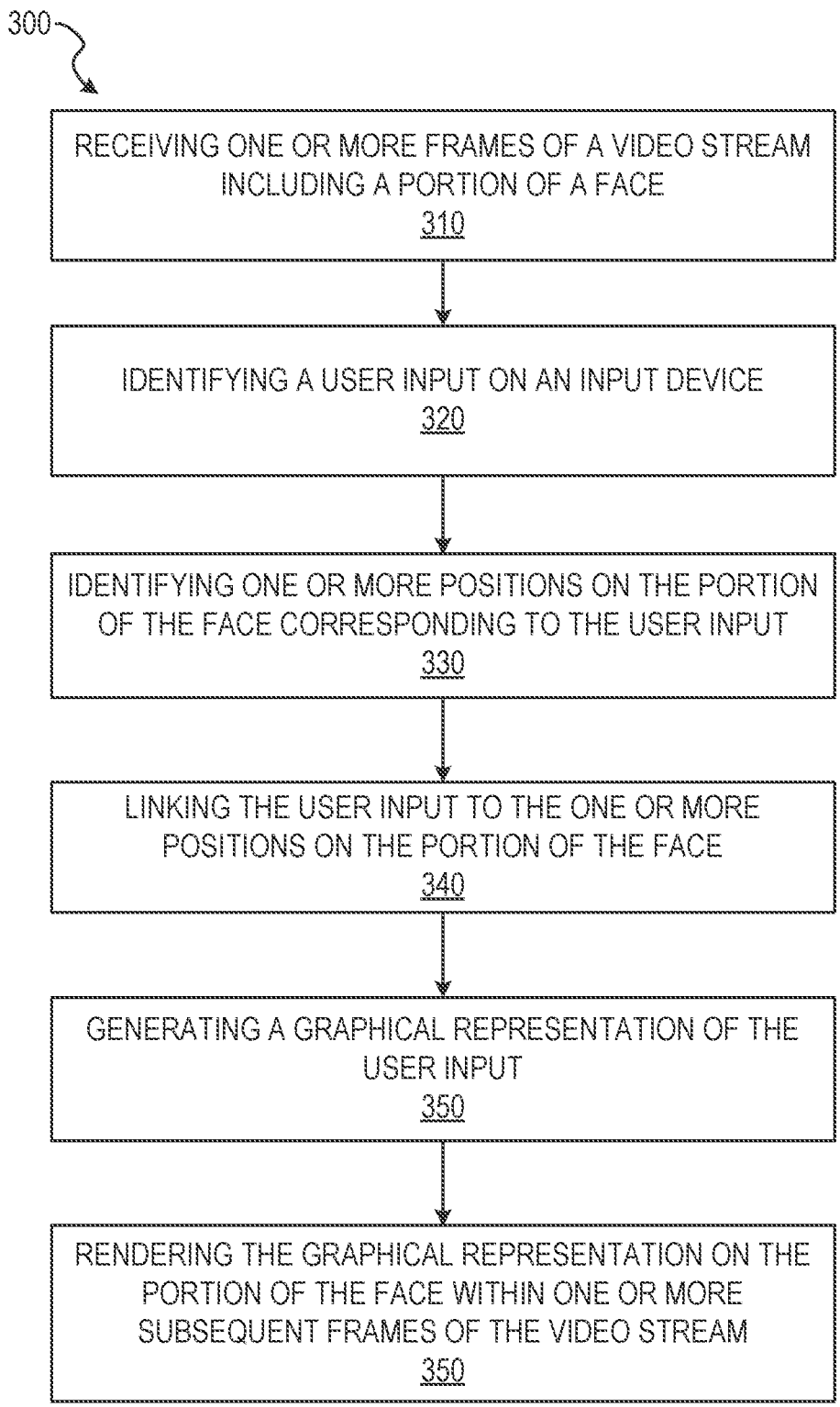
FIG. 3 is a flow diagram illustrating an example method for generating graphical representations on a face within one or more frames of a video stream while the video stream is being captured and presented on a display device of a client device, according to some example embodiments.

FIG. 3 depicts a flow diagram illustrating an example method 300 for generating graphical representations on a face within one or more frames of a video stream while the video stream is being captured and presented on a display device of a client device (e.g., a computing device). The operations of method 300 may be performed by components of the painting system 160, and are so described below for purposes of illustration.

In operation 310, the access component 210 receives or otherwise accesses one or more frames of a video stream. At least a portion of the one or more frames depict at least a portion of a face. In some embodiments, the access component 210 receives the one or more frames as a video stream captured by an image captured device associated with the client device 110 and presented on a user interface of a face painting application. The access component 210 may include the image capture device as a portion of hardware comprising the access component 210. In these embodiments, the access component 210 directly receives the one or more frames or the video stream captured by the image capture device. In some instances, the access component 210 passes all or a part of the one or more images or the video stream (e.g., a set of images comprising the video stream) to one or more components of the painting system 160, as described below in more detail.

In operation 320, the input component 220 identifies a user input on an input device of the client device 110 (e.g., a computing device or mobile computing device). The input component 220 may identify the user input based on receiving input or an indication of input from an input device of the client device 110. For example, the input component 220 may identify the user input received from a mouse, a cursor, a touch screen device, a button, a keypad, or any other suitable input device which is part of, connected to, or in communication with the client device 110.

In some embodiments, the user input is received through a touch screen device. The touch screen device may be configured to be sensitive to a pressure of a touch providing the user input. In these embodiments, the input component 220 determines a touch pressure of the user input. Based on the touch pressure of the user input, the input component 220 identifies an edge characteristic associated with the touch pressure. Touch pressure may be binary. Where touch pressure is binary, pressure above a specified threshold may be associated with a first aspect of the user input and pressure below the specified threshold may be associated with a second aspect of the user input. In these instances, the input component 220 determines the touch pressure exceeds a pressure threshold and identifies the first aspect as being associated with the user input. In some embodiments, the first aspect and the second aspect may be first and second edge characteristics. For example, the first edge characteristic may be a diffuse edge, which blends or blurs an edge of a line, and the second edge characteristic may be a sharp edge, which is clearly defined. In some embodiments, touch pressure may not be binary. In these instances, edge characteristics may be associated with two or more pressures or specified thresholds between two terminal values associated with a pressure of the user input. For example, a first terminal value may represent a lightest touch pressure perceptible to the touch screen and a second terminal value may represent a heaviest pressure perceptible to the touch screen. In these instances, two or more thresholds may be positioned at values between the first terminal value and the second terminal value. Each of the two or more thresholds may be associated with an edge characteristic or other user input or graphical representation characteristic such that pressure exceeding a threshold of the two or more thresholds may indicate a single characteristic or edge characteristic. The characteristics may be edge characteristics (e.g., sharpness of an edge), line weight or thickness, line color or color intensity, or any other suitable characteristic.

The user input may include selection of a color or set of colors once the access component 210 begins receiving frames of the video stream. The painting system 160 may cause presentation of a set of user input elements presented over the video stream to enable selection of colors, graphical effects (e.g., sparkles, neon glow, variable or timed glow, event based appearance), line weights, designs, and other options which affect the style, color, and timing of painted graphical representations. For example, a user input may include selection of a timing scheme or position scheme for presentation of a painted graphical representation. In these instances, the painting system 160 may cause presentation of painted graphical representations upon an event, such as rotation of the face or blinking of the eyes, or based on a timing element, such as timed intervals or for a set period of time. Where user input includes selection of a style, subsequent user input may be formatted according to one or more style characteristics set of a selected style. In some embodiments, styles available for selection include painting styles (e.g., cubist, impressionist, Shijo school, Shan Shui), color palette styles (e.g., neon glow, pastel), or other styles capable for creation through a set of predetermined style characteristics. For example, where the impressionist style is selected, painted graphical representations of subsequent user input may be configured within a pastel color palette, with diffuse edges, and with simulated brush strokes. By way of further example, where a neon color palette or style is selected, painted graphical representations generated from subsequent user input may be generated with a glowing effect. The glowing effect may be generated through a luminance value of colors within the painted graphical representations and by adjusting a brightness value of at least a portion of the frames of the video stream.

In operation 330, the position component 230 identifies one or more positions on the portion of the face corresponding to the user input. The position component 230 may identify the one or more positions based on a pixel position of the one or more positions on the portion of the face, facial landmarks on the portion of the face, one or more coordinates mapped to the portion of the face, or any other suitable position on the portion of the face. For example, the face may depict a set of known facial landmarks. The position component 230 may identify the one or more positions relative to the facial landmarks.

In some example embodiments in performing operation 330, the position component 230 determines a facial mesh on the portion of the face. The facial mesh identifies one or more facial landmarks depicted within the portion of the face. Determining the facial mesh may comprise making a projection of a mesh to a regular grid to separate the mesh into 100 by 100 cells by the regular grid. Although described as a grid, it should be understood that the mesh may be formed of intersecting or contacting polygons. For example, the mesh may be formed from a set of connected triangles where points of one or more of the triangles represent facial landmarks, landmark points, or points determined based on relative distances of facial landmarks. Once the mesh projection is formed, the position component 230 may determine a mesh element to which a cell of the grid corresponds, for each cell. The position component 230 may then determine the pixels corresponding to each of the determined mesh elements. In some instances, determining pixels corresponding to each mesh element may be performed using a breadth-first search.

The position component 230 may identify one or more coordinates of the user input. The one or more coordinates may align with or be identified relative to one or more cells, points, or intersections of the mesh. In some instances, the one or more coordinates may be identified as one or more pixels depicted within the mesh. In some embodiments, identifying the one or more coordinates of the user input may comprise determining one or more pixels selected within the user input (e.g., one or more pixels intersecting a line was drawn by the user input). Once the one or more pixels are determined, the position component 230 may determine portions, points, or coordinates within the mesh corresponding to the one or more determined pixels.

The position component 230 may map the one or more coordinates to at least a portion of the one or more facial landmarks. In some instances, relative distances of the one or more coordinates are determined with respect to the facial landmarks, mesh elements, or points on the mesh. In some instances, the position component 230 maps the one or more coordinates to one or more pixels within the frame which are mapped or otherwise associated with the mesh. The mapping may establish a reference for tracking the user input and graphical representations of the user input across multiple frames of the video stream. In these instances, tracking the user input or graphical representations may enable persistent graphical representations to be generated, tracked, and presented within the video stream in real time, as described in further detail and embodiments below.

In operation 340, the linking component 240 links the user input to the one or more positions on the portion of the face. In some embodiments, linking the user input to the one or more positions on the portion of the face creates a pixel independent association between the user input, or points within the user input, to the one or more positions of the face. The pixel independent association enables the user input to move with the portion of the face across multiple frames of the video stream. The link may be generated as a database, table, or data structure associating points of the user input and the one or more positions of the face. The database, table, or data structure may be referenced when the portion of the face is determined to occupy a different position within a frame as the portion of the face occupied in a previous frame of the video stream.

In operation 350, the generation component 250 generates a graphical representation of the user input. The graphical representation of the user input is linked, as in operation 340, to the one or more positions on the portion of the face. The graphical representation may comprise a line, portion of a line, shape, color, pattern, or any other representation of the user input. For example, the graphical representation may be a line generated to occupy the area occupied within the frame by the user input. In some embodiments, the graphical representation may be a painted line, shape, or design, to be presented in real time within frames of the video stream. The graphical representation may be generated to appear as paint, makeup, tattoo, or other representation positioned on or within skin or hair depicted on the portion of the face. In some instances, the graphical representation may be generated as physical objects or structures such as horns, masks, hair, hats, glasses, or other objects or structures positioned in, on, or proximate to the portion of the face.

In embodiments where the user input includes a touch pressure, one or more of the input component 220 and the generation component 250 assigns the edge characteristic, identified as associated with the touch pressure, to the graphical representation generated from the user input. For example, where the edge characteristic is a diffuse edge, the graphical representation, generated as a line of paint, may be positioned on the face and include an edge which spreads, evenly or unevenly, outwardly from a center point within the line. By way of further example, the diffuse edge may blend the edge of the graphical representation into one or more additional color of the portion of the face.

In operation 360, the rendering component 260 renders the graphical representation on the portion of the face within one or more subsequent frames of the video stream. The graphical representation may be presented on the portion of the face at the one or more positions. The rendering component 260 causes the graphical representation to be presented within the frames of the video stream. Once rendered by the rendering component 260, the graphical representation may be continually rendered on the frames of the video stream where the one or more positions of the portion of the face corresponding to the graphical representation appear within the frame. In frames where the one or more positions of the portion of the face are not present within one or more frames, the rendering component 260 may skip or otherwise not render the graphical representation within the one or more frames.

In some embodiments, once rendered, the rendering component 260 may store the graphical representation within a processor-readable storage device. Once stored, the graphical representation may be recalled based on one or more event. In some embodiments, the even may correspond to opening the face painting application after storing the graphical representation or initializing an instance of the face painting application after storage. In some instances, in response to initiating the face painting application, the access component 210 detects a portion of the face within a new video stream. The new video stream may be a video stream distinct from the video stream in which the graphical representation was generated and rendered. In response to detecting the portion of the face within the new video stream, the rendering component 260 renders the graphical representation, stored in the processor-readable storage device, within one or more frames of the new video stream.

Figure 4:
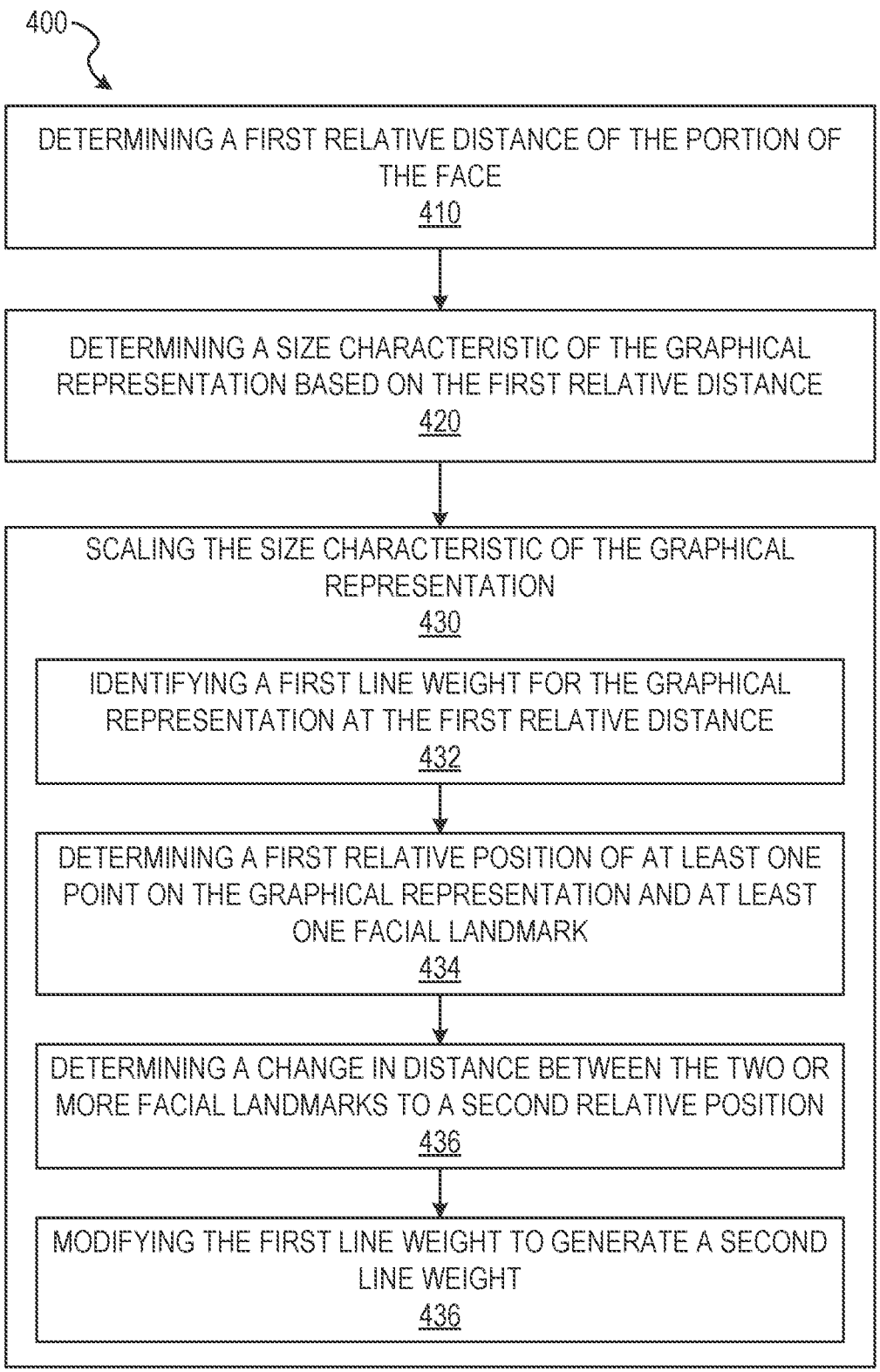
FIG. 4 is a flow diagram illustrating an example method for generating graphical representations on a face within one or more frames of a video stream while the video stream is being captured and presented on a display device of a client device, according to some example embodiments.

FIG. 4 shows a flow diagram illustrating an example method 400 for generating graphical representations on a face within one or more frames of a video stream while the video stream is being captured and presented on a display device of a client device (e.g., a computing device). The operations of method 400 may be performed by components of the painting system 160. In some instances, certain operations of the method 400 may be performed using one or more operations of the method 300 or as sub-operations of one or more operations of the method 300, as will be explained in more detail below. For example, as shown in FIG. 4, the method 400 may be performed as part of the operation 320.

In operation 410, the position component 230 determines a first relative distance of the portion of the face to the image capture device of the computing device. The first relative distance may be determined in a frame of the video stream. The position component 230 may determine the relative distance of the portion of the face based on an amount of the frame occupied by the portion of the face. Where the first relative distance is determined based on the occupied portion of the frame, the position component 230 may determine distances between facial landmarks and temporarily store the distances for comparison to determine changes in relative position of the portion of the face with respect to the image capture device.

In operation 420, the input component 220 determines a size characteristic of the graphical representation based on the first relative distance of the portion of the face. In some example embodiments, the input component 220 determines the size characteristic from the first relative distance and a constant size of the user input. In these embodiments, the user input is received from a touchscreen device from contact of a finger or stylus. The finger or stylus may have a fixed width or a width within a predetermined width range. The width or predetermined width range may be known to the input component 220 such that input received from the touchscreen has a fixed input width. The input component 220 may receive the user input with the fixed input width. The input component 220 in cooperation with the position component 230 and the linking component 240 may link one or more points on the fixed input width of the user input with one or more points, one or more positions, or one or more facial landmarks depicted on the portion of the face.

In some instances, the input component 220 may determine the size characteristic based, at least in part, on selection of a line weight selection in a user interface. For example, prior to receiving the user input corresponding to the graphical representation, the rendering component 260 may present a set selectable line weight elements. The input component 220 may receive a user input including a selection of a line weight, a thickness, a shape, or any other suitable user interface selection for a size characteristic from among the set of selectable line weight elements. The input component 220 incorporates the selection of the line weight element to modify a default line weight associated with the user input for the graphical representation.

In operation 430, the scaling component 270 scales the size characteristic of the graphical representation based on movement of the portion of the face from the first relative distance to a second relative distance in a subsequent frame of the video stream. For example, as a face moves closer to the image capture device, as depicted within one or more frames of the video stream, line weights of the graphical representation may increase such that the lines of the graphical representation become thicker as the face approaches the image capture device. Similarly, as the portion of the face moves farther from the image capture device, the line weights of the graphical representation decreases such that the lines become thinner. In some embodiments, the scaling component 270 maintains a line weight ratio for the graphical representation with respect to the positions, points, or facial landmarks of the portion of the face. For example, though a line weight becomes thicker as the portion of the face moves closer to the image capture device, the aspect ratio of the line weight remains constant during the scaling. In these instances, though the pixel value of the graphical representation changes as the size characteristic scales, the ratio is maintained so that the graphical representation occupies the same apparent space on the portion of the face regardless of the relative distance of the portion of the face from the image capture device.

In some embodiments, the scaling component 270 may include a minimum face scale or determine a minimum face scale for use in scaling graphical representations. The scaling component 270 may use a minimum face scale predetermined within the painting system 160 for a size of the portion of the face with respect to line weights or other size characteristics of the graphical representations. In some instances, where the scaling component 270 includes a predetermined minimum face scale, the scaling component 270 may generate and cause presentation of instructions (e.g., via user interface elements) presented over the video stream to instruct a user to move the portion of the face or the image capture device until the portion of the face is positioned within the frames of the video at a size corresponding to the minimum face scale. In some embodiments, the scaling component 270 determines the minimum face scale by assuming an initially presented portion of the face within the frames of the video stream is a minimum size of the face to be presented within the video stream.

In operation 432 while scaling the size characteristic, the scaling component 270 identifies a first line weight for the graphical representation at the first relative distance. The scaling component 270 may identify the first line weight based on one or more of the user input for the line weight selection, the user input corresponding to the graphical representation, and the first relative distance. In some embodiments, as described above, the scaling component 270 may identify the first line weight as a selected line weight, the fixed input width, or other specified value. In some instances, the scaling component 270 identifies the first line weight as determined using the fixed input width and the first relative distance of the portion of the face.

In operation 434, the scaling component 270 determines a first relative position of at least one point on the graphical representation and two or more facial landmarks depicted on the portion of the face. The scaling component 270 may determine the first relative position of the at least one point at one or more pixels within one or more frames of the video stream. In some instances, the scaling component 270 determines the first relative position as one or more coordinates within one or more frames of the video stream, where the video stream is segmented into a set of coordinates dividing the frame for object tracking.

In operation 436, the scaling component 270 determines a change in distance between the two or more facial landmarks at the second relative distance. In some embodiments, the scaling component 270 determines the change in distance by identifying a second relative position for the two or more facial landmarks depicted on the portion of the face. The scaling component 270 determines the change in distance by comparing the first relative position of the two or more facial landmarks and a second relative position, at the second relative distance, for the two or more facial landmarks. The scaling component 270 may compare pixel or coordinate positions of the first relative position and the second relative position to determine whether the pixel or coordinate positions match. Where the pixel or coordinate positions do not match, the scaling component 270 may identify the change in distance.

In operation 438, the scaling component 270 modifies the first line weight for the graphical representation based on the change in distance between the two or more facial landmarks to generate a second line weight for the graphical representation. In some embodiments, in response to identifying the change in distance between the first relative position and the second relative position, the scaling component 270 modifies the weight for the graphical representation by changing the first line weight to the second line weight. The second line weight maintains an aspect ratio which existed between the first line weight and the two or more facial features at the first relative distance.

Figure 5:
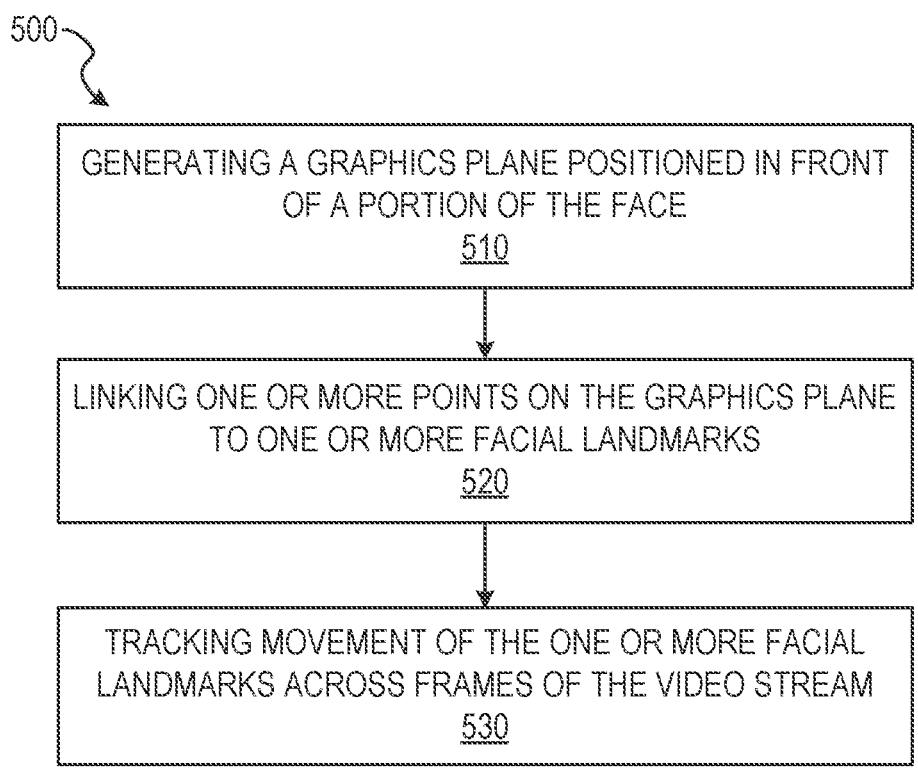
FIG. 5 is a flow diagram illustrating an example method for generating graphical representations on a face within one or more frames of a video stream while the video stream is being captured and presented on a display device of a client device, according to some example embodiments.

FIG. 5 depicts a flow diagram illustrating an example method 500 for generating graphical representations on a face within one or more frames of a video stream while the video stream is being captured and presented on a display device of a client device (e.g., a computing device). The operations of method 500 may be performed by components of the painting system 160. In some instances, certain operations of the method 500 may be performed using one or more operations of the methods 300 or 400, in one or more of the described embodiments, or as sub-operations of one or more operations of the methods 300 or 400, as will be explained in more detail below.

In operation 510, the generation component 250 generates a graphics plane positioned in front of the portion of the face. The graphics plane may be transparent and extend outwardly from the portion of the face. The graphics plane may include a set of coordinates distributed about the graphics plane. The graphics plane may be generated as an image layer within frames of the video stream. In some instances, the image layer is generated as a transparent overlay positioned over the image depicted within the frame of the video stream.

In some embodiments, the graphical plane is contoured such that a graphical representation may be linked to coordinates on the graphical plane including two or more three dimensional positions with respect to the portion of the face. In some embodiments, the contoured graphical plane is generated as spanning two or more image layers. The two or more image layers may overlay one another and be positioned as transparent overlays positioned over the image depicted within the frame of the video stream. Upon rotation of the image capture device about the portion of the face, the two or more image layers act as a contoured plane overlaying the portion of the face at two or more angles of view within the video stream. For example, where a user has drawn a pair of antlers extending upwardly from the portion of the face with the user input and rendered as the graphical representation, portions of the antlers may be positioned across the two or more images acting as the contoured graphical plane. As the image capture device is rotated around the portion of the face, the antlers are represented as two or three dimensional antlers extending upwardly from the portion of the face. By way of further example, where the user input for the graphical representation is received on various parts of the portion of the face within the video stream, the generation component 250 may generate and, at least temporarily, store graphical representations for parts of the portion of the face which is not continually in view. In this way, the painting system 160 can receive input and generate painted graphical representations covering the entire face of a user. Where the user is facing straight toward the image capture device, the painted graphical representations on the front of the face may be recalled or generated for rendering and presentation within the video stream. Where the user rotates or the image capture device is rotated to show a side of the face, the graphical representations for the side of the face may be recalled or generated for rendering. Further, as the face or image capture device is rotated, painted graphical representations for each newly included portion of the face (e.g., angles from the front facing to the side facing views) may be recalled or generated such that a smooth rotation may be rendered and displayed including the painted graphical representations associated with each area, position, point, or facial landmark as the area, position, point, or landmark, rotate into view.

In operation 520, the linking component 240 links one or more points on the graphics plane to one or more facial landmarks depicted on the portion of the face. The linking component 240 may link the one or more points on the graphical plane to one or more facial landmarks similarly to or the same as the linking performed in operation 340.

In operation 530, the tracking component 280 tracks movement of the one or more facial landmarks. The tracking component 280 matches the movement of the one or more facial landmarks with movement of the graphics plane. The tracking component 280 may track movement of the one or more facial landmarks across frames of the video stream using one or more facial tracking algorithms. For example, the tracking component 280 may track the facial landmarks using active appearance models, principal component analysis, eigen tracking, deformable surface models, or any other suitable tracking methods. The movement of the facial landmarks may be tracked with respect to forward motion, rearward motion, rotation, translation, and other movements between frames of the video stream.

Figure 6:
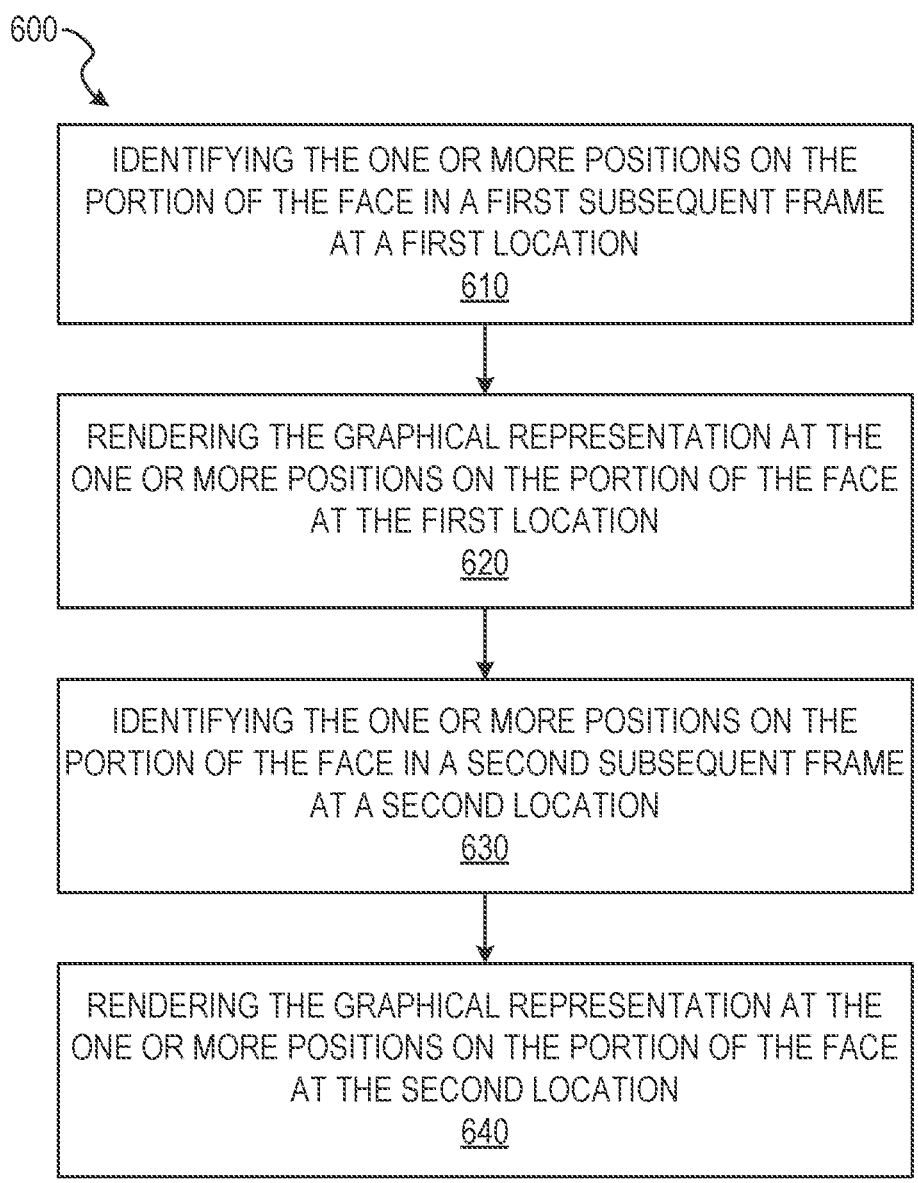
FIG. 6 is a flow diagram illustrating an example method for generating graphical representations on a face within one or more frames of a video stream while the video stream is being captured and presented on a display device of a client device, according to some example embodiments.

FIG. 6 shows a flow diagram illustrating an example method 600 for generating graphical representations on a face within one or more frames of a video stream while the video stream is being captured and presented on a display device of a client device (e.g., a computing device). The operations of method 600 may be performed by components of the painting system 160. In some instances, certain operations of the method 600 may be performed using one or more operations of the method 300, 400, or 500 or as sub-operations of one or more operations of the method 300, 400, or 500, as will be explained in more detail below. The method 600 may enable tracking of one or more positions on the portion of the face to render the graphical representation as a persistent graphical representation.

In operation 610, the position component 230 identifies the one or more positions on the portion of the face in a first subsequent frame at a first location within the first subsequent frame. In some embodiments, the position component 230 may identify the one or more positions on the portion of the face similarly to or the same as operations 330 or 410.

In operation 620, the rendering component 260 renders the graphical representation at the one or more positions on the portion of the face at the first location. The rendering component 260 may render the graphical representation similarly to or the same as the rendering performed in operation 360, described above. The graphical representation may be rendered within the video stream in real time such that, after generation of the graphical representation, the rendering component 260 modifies the video stream by depicting the graphical representation within one or more frames of the video stream. The graphical representation may be depicted on the one or more frames of the video by inclusion in an image layer (e.g., the graphical plane) overlaying the one or more frames.

In operation 630, the position component 230 identifies the one or more positions on the portion of the face in a second subsequent frame at a second location within the second subsequent frame. In some instances, the position component 230 may identify the one or more positions in the second subsequent frame similarly to or the same as the identification performed in operations 330, 410, or 436, described above.

In operation 640, the rendering component 260 renders the graphical representation at the one or more positions on the portion of the face at the second location. The rendering component 260 may render the graphical representation within the frames of the video stream similarly to or the same as operations 360 or 620.

Figure 7:
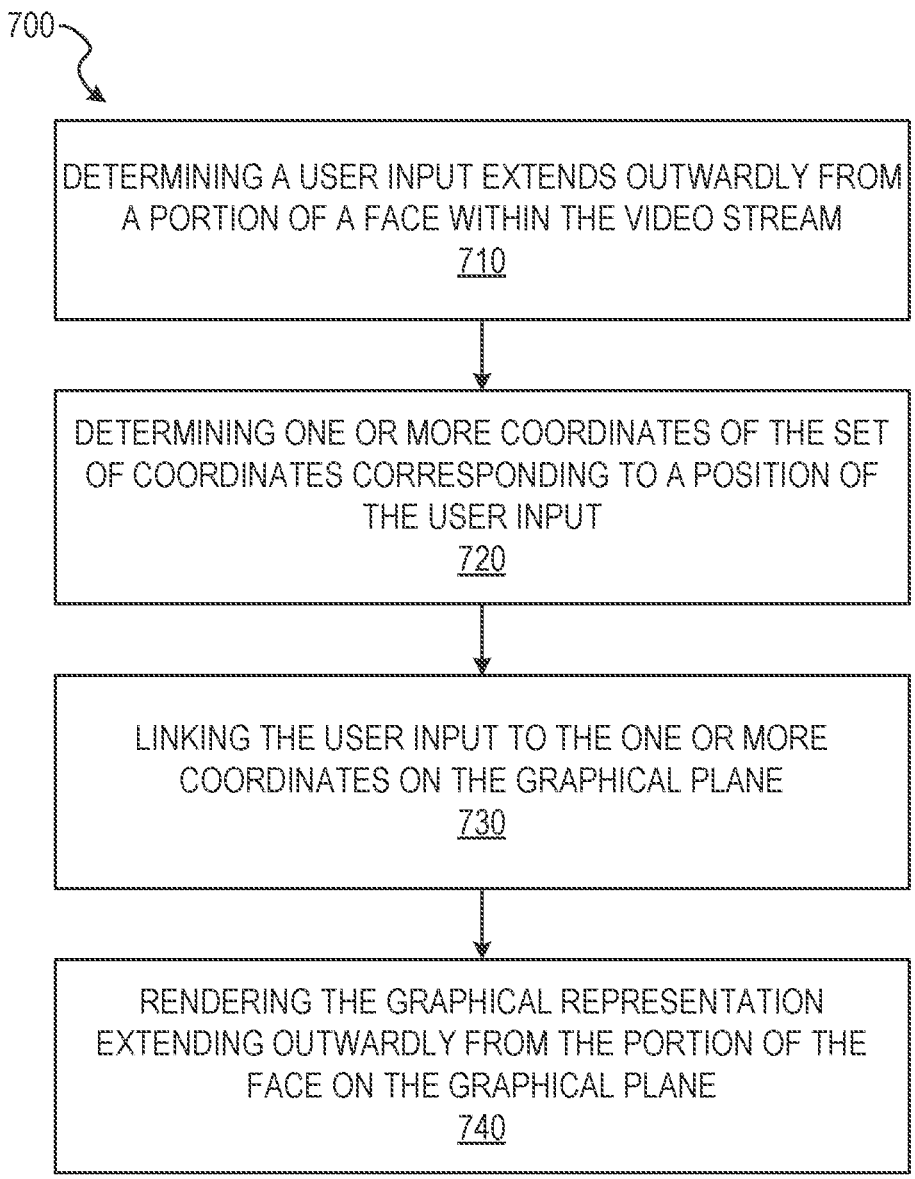
FIG. 7 is a flow diagram illustrating an example method for generating graphical representations on a face within one or more frames of a video stream while the video stream is being captured and presented on a display device of a client device, according to some example embodiments.

FIG. 7 shows a flow diagram illustrating an example method 700 for generating graphical representations on a face within one or more frames of a video stream while the video stream is being captured and presented on a display device of a client device (e.g., a computing device). The operations of method 700 may be performed by components of the painting system 160. In some instances, certain operations of the method 700 may be performed using one or more operations of the method 300, 400, 500, or 600 or as sub-operations of one or more operations of the method 300, 400, 500, or 600, as will be explained in more detail below.

In operation 710, the input component 220 determines the user input extends outwardly from the portion of the face within the video stream. In some embodiments, the input component 220 receives input which, prior to termination of the user input, traverses a portion of a frame of the video stream which is not included as part of the portion of the face. The input component 220 may determine the user input extends outwardly from the portion of the face based on the position component 230 identifying bounds of the portion of the face within frames of the video stream.

In operation 720, the position component 230 determines one or more coordinates of the set of coordinates corresponding to a position of the user input. In some embodiments, the one or more coordinates are coordinates, points, or facial landmarks positioned on the portion of the face. In these embodiments, the operation 720 may be performed similarly to or the same as operation 330, described above. In some instances, the position component 230 identifies a set of frame coordinates independent of the coordinates of the portion of the face depicted within the frame. The frame coordinates segment the frame into frame regions. At least a portion of the frame coordinates may be occupied by the portion of the face. At least a portion of the frame coordinates may be occupied by a background, without the portion of the face. In these instances, the position component 230 determines the one or more coordinates of the set of coordinates for the user input corresponding with one or more frame coordinates unassociated with the portion of the face.

In operation 730, the linking component 240 links the user input to the one or more coordinates on the graphical plane. In some embodiments, the linking component 240 links the user input to the one or more coordinates on the graphical plane similarly to or the same as operations 340 or 520, described above. The user input may be linked to the one or more coordinates on the graphical plane which correspond to one or more frame coordinates. In some instances, at least a portion of the one or more coordinates linked to the user input are coordinates corresponding to one or more frame coordinates and a portion of the one or more coordinates linked to the user input are coordinates corresponding to the portion of the face.

In operation 740, the rendering component 260 renders the graphical representation. The graphical representation may be rendered to extend outwardly from the portion of the face on the graphical plane within one or more subsequent frames of the video stream. In some example embodiments, the rendering component 260 renders the graphical representation similarly to or the same as operations 360, 620, or 640.

Figure 8:
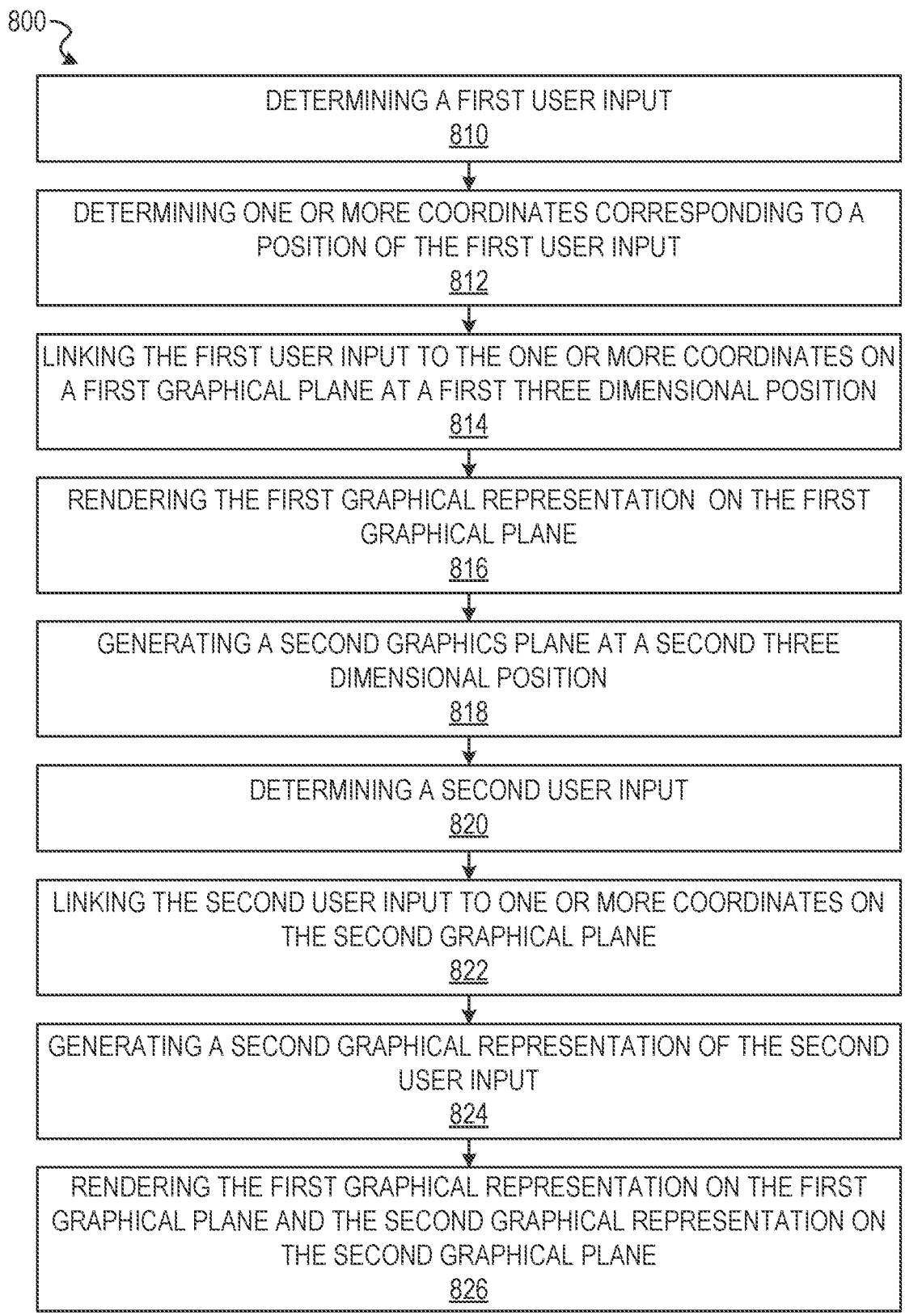
FIG. 8 is a flow diagram illustrating an example method for generating graphical representations on a face within one or more frames of a video stream while the video stream is being captured and presented on a display device of a client device, according to some example embodiments.

FIG. 8 shows a flow diagram illustrating an example method 800 for generating graphical representations on a face within one or more frames of a video stream while the video stream is being captured and presented on a display device of a client device (e.g., a computing device). The operations of method 800 may be performed by components of the painting system 160. In some instances, certain operations of the method 800 may be performed using one or more operations of any of methods 300, 400, 500, 600, or 700 or as sub-operations of one or more operations of methods 300, 400, 500, 600, or 700, as will be explained in more detail below.

In operation 810, the input component 220 determines a first user input. The first user input extends outwardly from the portion of the face within the video stream. In some embodiments, the input component 220 determines the first user input similarly to or the same as one or more of operations 320, 420, or 710.

In operation 812, the position component 230 determines one or more coordinates of the set of coordinates corresponding to a position of the first user input. In some example embodiments, the position component 230 determines the one or more coordinates similarly to or the same as described in operation 330, 410, or 720, described above.

In operation 814, the linking component 240 links the first user input to the one or more coordinates on a first graphical plane. The first graphical plane may be positioned at a first three dimensional position with respect to the portion of the face. In some example embodiments, the linking component 240 performs operation 814 similarly to or the same as described with respect to operations 340 or 520, described above. In some instances, the linking component 240 creates a data structure, storing, at least temporarily on a processor-readable storage device, the links between the first user input and the one or more coordinates on the first graphical plane.

In operation 816, the rendering component 260 renders the first graphical representation. The first graphical representation may be rendered to extend outwardly from the portion of the face on the first graphical plane within one or more subsequent frames of the video stream. In some example embodiments, the rendering component 260 performs operation 816 similarly to or the same as described with respect to one or more of operations 360, 620, 640, or 740, described above.

In operation 818, the generation component 250 generates a second graphics plane at a second three dimensional position with respect to the portion of the face. In some example embodiments, the generation component 250 generates the second graphics plane similarly to or the same as one or more of operations 350 or 510. The second graphics plane may be generated as an overlay overlapping at least a portion of the first graphics plane and at least a part of the portion of the face. In some instances, the second graphics plane may be positioned such that, upon rotation of the image capture device about the portion of the face, the second graphics plane appears to be positioned at a three dimensional position separated a distance from the position of the first graphics plane or the portion of the face depicted within the frame of the video stream.

In operation 820, the input component 220 determines a second user input positioned within a frame of the video stream. In some example embodiments, the input component 220 determines the second user input positions similarly to or the same as operation 320 or 710.

In operation 822, the linking component 240 links the second user input to one or more coordinates on the second graphical plane. In some example embodiments, the linking component 240 performs operation 822 similarly to or the same as operation 340, 520, or 730.

In operation 824, the generation component 250 generates a second graphical representation of the second user input at the one or more coordinates on the second graphical plane. In some example embodiments, the generation component 250 generates the second graphical representation of the second user input similarly to or the same as operations 350, 510, or 818.

In operation 826, the rendering component 260 renders the first graphical representation on the first graphical plane and the second graphical representation on the second graphical plane. The rendering component 260 may render the first graphical representation and the second graphical representation within subsequent frames of the video stream. In some example embodiments, the rendering component 260 renders each of the first graphical representation and the second graphical representation similarly to or the same as operations 360, 620, 640, or otherwise described above. The first graphical representation and the second graphical representation may be rendered on the frames of the video on the first and second graphical planes, respectively, along with the depiction of the portion of the face within the frame. The rendering component 260 may render the first graphical representation and the second graphical representation in one or more frames of the video stream in real time once generated.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 9:
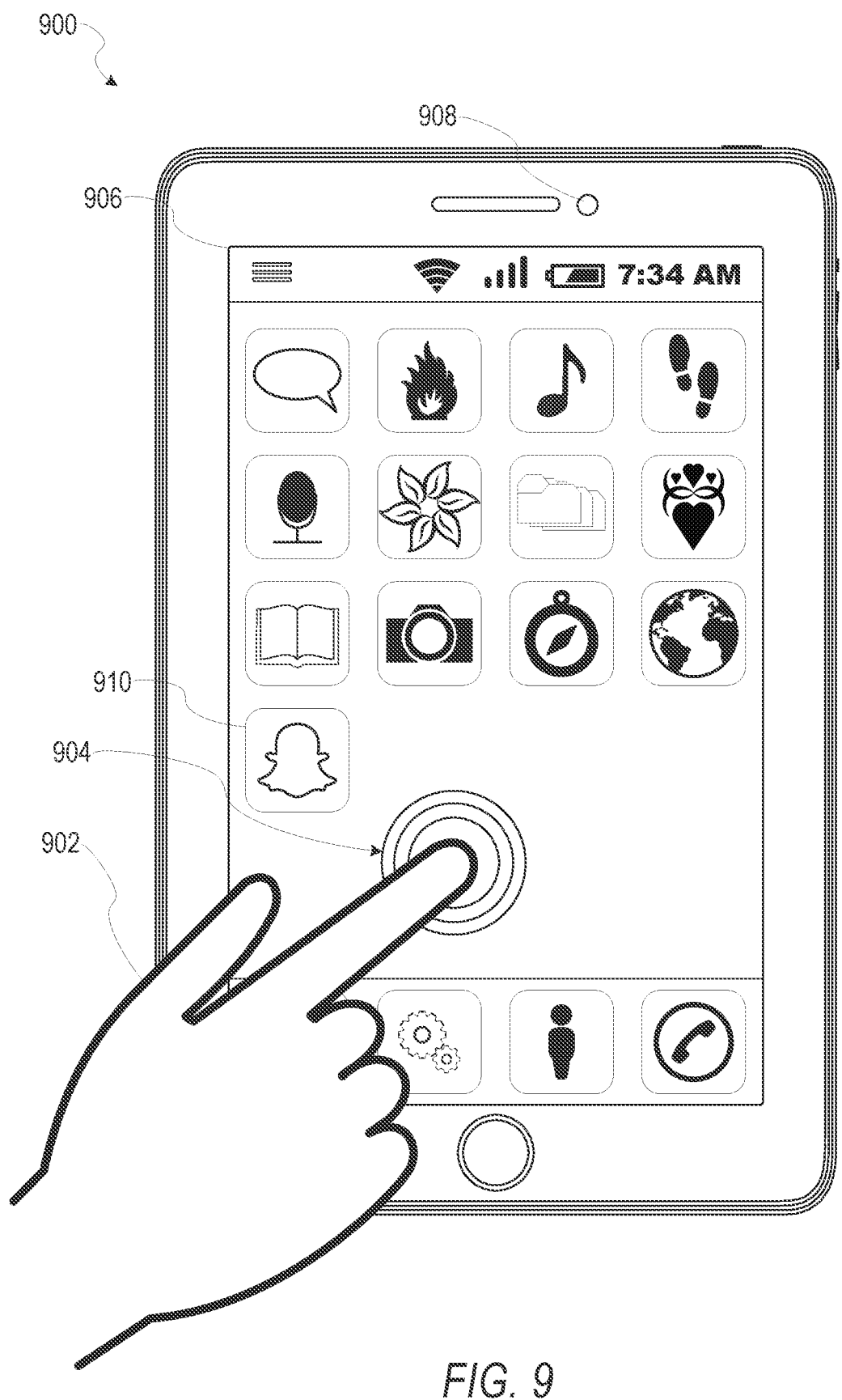
FIG. 9 is a user interface diagram depicting an example mobile device and mobile operating system interface, according to some example embodiments.

FIG. 9 illustrates an example mobile device 900 executing a mobile operating system (e.g., IOS™, ANDROID™, WINDOWS® Phone, or other mobile operating systems), consistent with some embodiments. In one embodiment, the mobile device 900 includes a touch screen operable to receive tactile data from a user 902. For instance, the user 902 may physically touch 904 the mobile device 900, and in response to the touch 904, the mobile device 900 may determine tactile data such as touch location, touch force, or gesture motion. In various example embodiments, the mobile device 900 displays a home screen 906 (e.g., Springboard on IOS™) operable to launch applications or otherwise manage various aspects of the mobile device 900. In some example embodiments, the home screen 906 provides status information such as battery life, connectivity, or other hardware statuses. The user 902 can activate user interface elements by touching an area occupied by a respective user interface element. In this manner, the user 902 interacts with the applications of the mobile device 900. For example, touching the area occupied by a particular icon included in the home screen 906 causes launching of an application corresponding to the particular icon.

The mobile device 900, as shown in FIG. 9, includes an imaging device 908. The imaging device may be a camera or any other device coupled to the mobile device 900 capable of capturing a video stream or one or more successive images. The imaging device 908 may be triggered by the painting system 160 or a selectable user interface element to initiate capture of a video stream or succession of frames and pass the video stream or succession of images to the painting system 160 for processing according to the one or more methods described in the present disclosure.

Many varieties of applications (also referred to as "apps") can be executing on the mobile device 900, such as native applications (e.g., applications programmed in Objective-C, Swift, or another suitable language running on IOS™ or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 900 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 900 includes a social messaging app 910 such as SNAPCHAT® that, consistent with some embodiments, allows users to exchange ephemeral messages that include media content. In this example, the social messaging app 910 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present invention.

In some embodiments, an ephemeral message system may include messages having ephemeral video clips or images which are deleted following a deletion trigger event such as a viewing time or viewing completion. In such embodiments, a device implementing the painting system 160 may identify, track, extract, and generate representations of a face within the ephemeral video clip, as the ephemeral video clip is being captured by the device and transmit the ephemeral video clip to another device using the ephemeral message system.

Software Architecture

Figure 10:
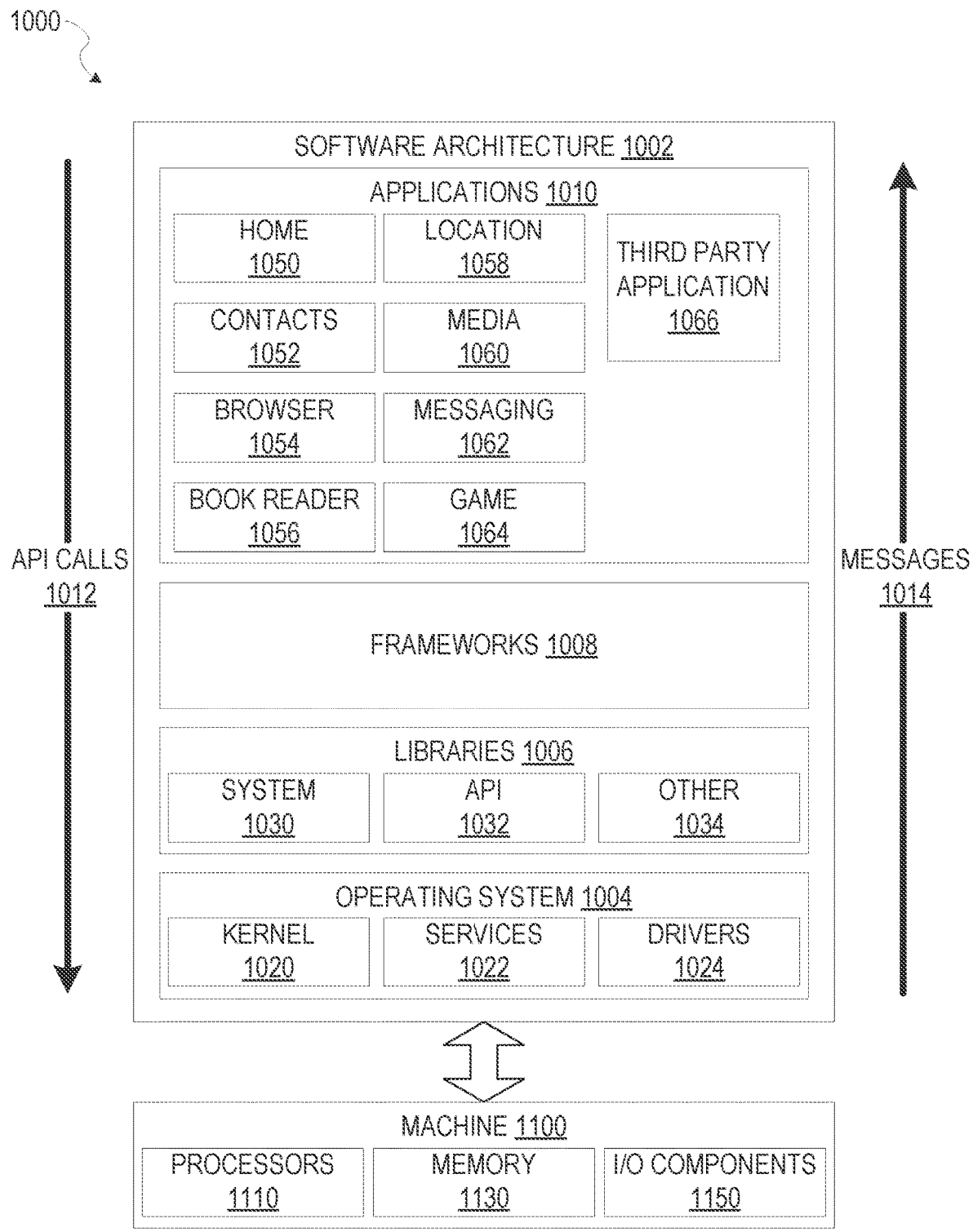
FIG. 10 is a block diagram illustrating an example of a software architecture that may be installed on a machine, according to some example embodiments.

FIG. 10 is a block diagram 1000 illustrating an architecture of software 1002, which can be installed on the devices described above. FIG. 10 is merely a non-limiting example of a software architecture, and it will be appreciated that many other architectures can be implemented to facilitate the functionality described herein. In various embodiments, the software 1002 is implemented by hardware such as machine a 1100 of FIG. 11 that includes processors 1110, memory 1130, and I/O components 1150. In this example architecture, the software 1002 can be conceptualized as a stack of layers where each layer may provide a particular functionality. For example, the software 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third party application 1066. According to some embodiments, the applications 1010 are programs that execute functions defined in the programs. Various programming languages can be employed to create the applications 1010, structured in a variety of manners, such as object-oriented programming languages (e.g., Objective-C, Java, or C++) or procedural programming languages (e.g., C or assembly language). In a specific example, the third party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 1066 can invoke the API calls 1012 provided by the operating system 1004 to facilitate functionality described herein.

Example Machine Architecture and Machine-Readable Medium

Figure 11:
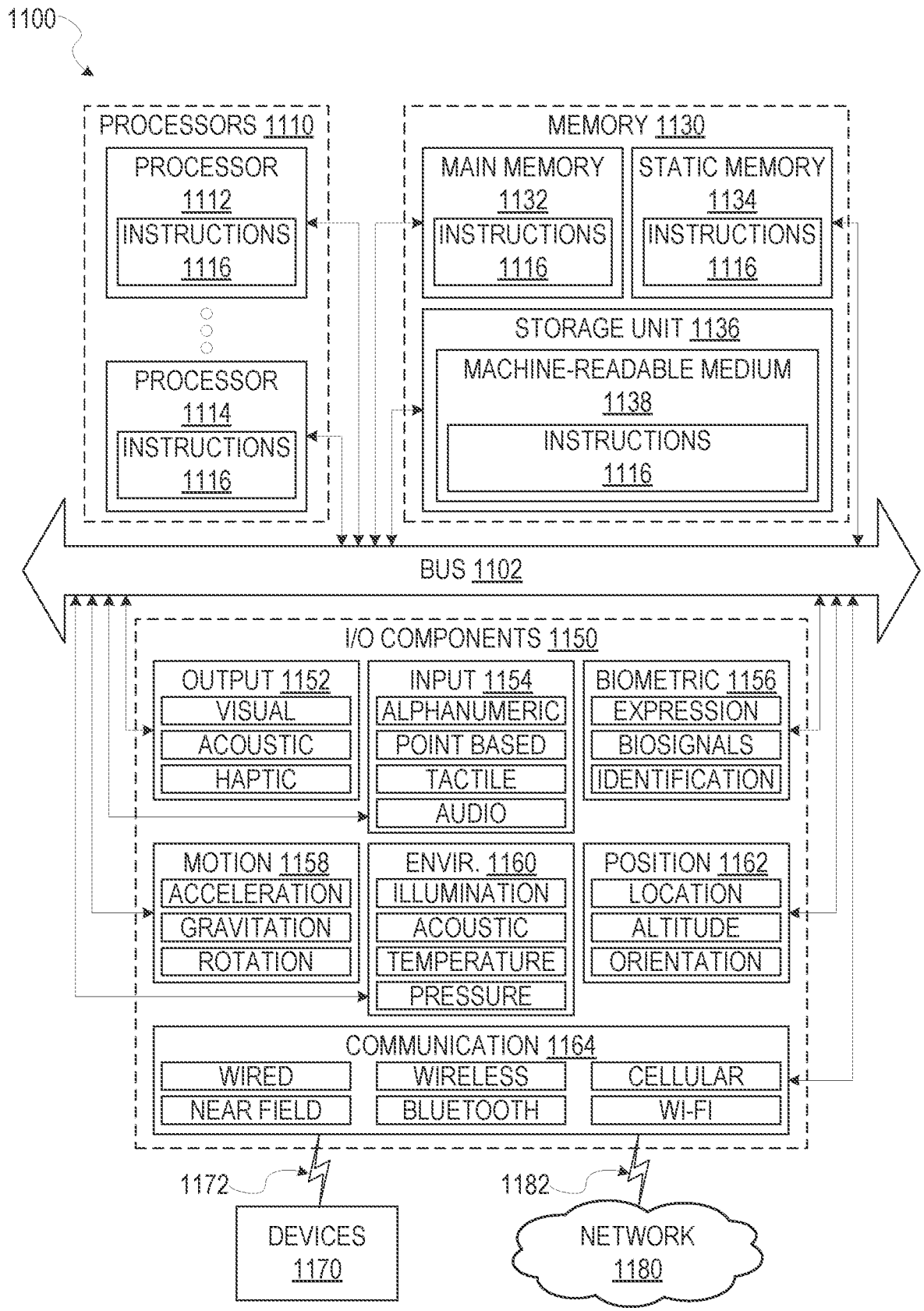
FIG. 11 is a block diagram presenting a diagrammatic representation of a machine in the form of a computer system within which a set of instructions may be executed for causing the machine to perform any of the methodologies discussed herein, according to an example embodiment.

FIG. 11 is a block diagram illustrating components of a machine 1100, according to some embodiments, able to read instructions (e.g., processor executable instructions) from a machine-readable medium (e.g., a non-transitory processor-readable storage medium or processor-readable storage device) and perform any of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any of the methodologies discussed herein can be executed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1112 and a processor 1114 that may execute the instructions 1116. The term "processor" is intended to include multi-core processors that may comprise two or more independent processors (also referred to as "cores") that can execute instructions contemporaneously. Although FIG. 11 shows multiple processors, the machine 1100 may include a single processor with a single core, a single processor with multiple cores (e.g., a multi-core processor), multiple processors with a single core, multiple processors with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by processors of the machine 1100 (e.g., processors 1110), cause the machine 1100 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium should be considered as being transportable from one physical location to another. Additionally, since the machine-readable medium 1138 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   linking a first user input to one or more coordinates on a first transparent plane overlaid on a first portion of an object;
   linking a second user input to one or more coordinates on a second transparent plane overlaid on a second portion of the object;
   rendering first and second graphical representations on a video depicting the object by overlaying at least a portion of the first transparent plane on the object when the first portion of the object is depicted in the video and overlaying at least a portion of the second transparent plane on the object when the second portion of the object is depicted in the video; and
   in response to determining that the first user input extends outwardly from the object, rendering the first transparent plane relative to the object within one or more frames of the video as extending outwardly from the object.

2. The method of claim 1, further comprising:
   capturing the video.

3. The method of claim 1, wherein the first graphical representation is rendered on the first transparent plane, further comprising:
   determining a first relative distance of the object to an image capture device in a frame of the video;
   determining a size characteristic of the first graphical representation on the first transparent plane based on the first relative distance of the object; and
   scaling the size characteristic of the first graphical representation on the first transparent plane based on movement of the object from the first relative distance to a second relative distance in a subsequent frame of the video.

4. The method of claim 3, wherein scaling the size characteristic of the transparent plane further comprises:
   identifying a first line weight for the first transparent plane at the first relative distance;
   determining a first relative position of at least one point on the first transparent plane and two or more landmarks depicted on the object;
   determining a change in distance between the two or more landmarks at the second relative distance; and modifying the first line weight for the first transparent plane based on the change in distance between the two or more landmarks to generate a second line weight for the first transparent plane.

5. The method of claim 1, further comprising:
linking one or more points on the second transparent plane to one or more landmarks depicted on the object; and
tracking movement of the one or more landmarks and matching the movement of the one or more landmarks with movement of the second transparent plane.

6. The method of claim 1, further comprising:
selectively rendering first and second transparent planes in the video.

7. The method of claim 1 further comprising:
storing the first transparent plane within a processor-readable storage device;
in response to initiating an application, detecting an object within the video; and
in response to detecting the object, rendering the first and second transparent planes within a set of frames of the video.

8. The method of claim 1, wherein the first user input is received via a touch screen device configured to be sensitive to a pressure of a touch, and wherein determining the first user input comprises:
determining a touch pressure of the first user input;
identifying an at least one of an edge sharpness, a line color, or color intensity associated with the touch pressure; and
assigning the at least one of an edge sharpness, a line color, or color intensity to the first transparent plane generated from the first user input.

9. The method of claim 1, further comprising:
retrieving a specified minimum scale;
determining that a size of the object depicted in at least one frame of the video is less than the specified minimum scale; and
overlaying on top of a frame of the video a message informing a user to position the object closer to an image capture device until the size of the object corresponds to the specified minimum scale.

10. The method of claim 1, further comprising:
determining an amount of a frame of the video occupied by the object;
determining a relative distance of the object to an image capture device based on the amount of the frame occupied by the object; and
scaling a size of the first transparent plane based on the relative distance of the object.

11. The method of claim 1, wherein an event is selected by a user and the event comprises a change from a first manner in which an object landmark appears in a first frame of a set of frames of the video to a second manner in which the object landmark appears in a second frame of the set of frames.

12. The method of claim 1, wherein the object comprises a face, and further comprising:
determining a characteristic of the face; and
modifying edge and size characteristics of the first and second transparent planes based on the characteristic of the face.

13. The method of claim 1, wherein a portion of the first transparent plane overlaps a portion of the second transparent plane, the first transparent plane comprising a team logo or player number, and wherein the first portion comprises a check of a face.

14. The method of claim 1, wherein the first transparent plane is positioned relative to a rotation of an image capture device used to capture the video, the object comprising a face, the first portion comprising a front of the face and the second portion comprising a side of the face.

15. The method of claim 1, further comprising:
causing display of a set of input elements for selecting graphical effects of the first transparent plane, the graphical effects comprising a sparkles effect, a neon glow effect, and a timed glow effect.

16. The method of claim 1, further comprising:
causing display of a style graphical effect for selecting a painting style of the first transparent plane and a color palette style of the first transparent plane.

17. The method of claim 16, wherein the painting style enables selection between a cubist and impressionist styles, and wherein the color palette style enables selection between neon glow and pastel styles.

18. A system, comprising:
one or more processors; and
a non-transitory processor-readable storage medium coupled to the one or more processors and storing processor executable instructions that, when executed by the one or more processors, cause the one or more processors to perform operations comprising:
linking a first user input to one or more coordinates on a first transparent plane overlaid on a first portion of an object;
linking a second user input to one or more coordinates on a second transparent plane overlaid on a second portion of the object;
rendering first and second graphical representations on a video depicting the object by overlaying at least a portion of the first transparent plane on the object when the first portion of the object is depicted in the video and overlaying at least a portion of the second transparent plane on the object when the second portion of the object is depicted in the video; and
in response to determining that the first user input extends outwardly from the object, rendering the first transparent plane relative to the object within one or more frames of the video as extending outwardly from the object.

19. A non-transitory processor-readable storage medium storing processor executable instructions that, when executed by a processor of a machine, cause the machine to perform operations comprising:
linking a first user input to one or more coordinates on a first transparent plane overlaid on a first portion of an object;
linking a second user input to one or more coordinates on a second transparent plane overlaid on a second portion of the object;
rendering first and second graphical representations on a video depicting the object by overlaying at least a portion of the first transparent plane on the object when the first portion of the object is depicted in the video and overlaying at least a portion of the second transparent plane on the object when the second portion of the object is depicted in the video; and
in response to determining that the first user input extends outwardly from the object, rendering the first transparent plane relative to the object within one or more frames of the video as extending outwardly from the object.

20. The non-transitory processor-readable storage medium of claim 19, wherein a portion of the first transparent plane overlaps a portion of the second transparent plane, the first transparent plane comprising a team logo or player number, and wherein the first portion comprises a cheek of a face.

* * * * *

UNITED STATES PATENT AND TRADEMARK OFFICE
CERTIFICATE OF CORRECTION

| | |
|---|---|
| PATENT NO. | : 12,231,806 B2 |
| APPLICATION NO. | : 18/223215 |
| DATED | : February 18, 2025 |
| INVENTOR(S) | : Monastyrshyn et al. |

Page 1 of 1

It is certified that error appears in the above-identified patent and that said Letters Patent is hereby corrected as shown below:

On the Title Page

On page 2, in Column 2, under "Other Publications", Line 19, delete "16/789, 20121," and insert --16/789,121,-- therefor On page 3, in Column 2, under "Other Publications", Line 9, delete "Occt. 11, 2017"," and insert --Oct. 11, 2017",-- therefor In the Claims In Column 27, Line 67, in Claim 13, delete "check" and insert --cheek-- therefor Signed and Sealed this
Seventh Day of October, 2025

John A. Squires
*Director of the United States Patent and Trademark Office*